(12) United States Patent
Divakaruni et al.

(10) Patent No.: US 11,746,840 B2
(45) Date of Patent: Sep. 5, 2023

(54) RETENTION SYSTEM FOR SHIM ON BACKPLATE OF BRAKE PAD ASSEMBLY

(71) Applicant: ZF Active Safety US Inc., Livonia, MI (US)

(72) Inventors: Saikiran Divakaruni, Rochester Hills, MI (US); Jacob Flight, Royal Oak, MI (US)

(73) Assignee: ZF Active Safety US Inc., Livonia, MI (US)

( * ) Notice: Subject to any disclaimer, the term of this patent is extended or adjusted under 35 U.S.C. 154(b) by 137 days.

(21) Appl. No.: 17/334,054

(22) Filed: May 28, 2021

(65) Prior Publication Data

US 2022/0381305 A1    Dec. 1, 2022

(51) Int. Cl.
*F16D 65/00* (2006.01)
*F16D 65/095* (2006.01)

(52) U.S. Cl.
CPC ....... *F16D 65/0006* (2013.01); *F16D 65/095* (2013.01)

(58) Field of Classification Search
CPC . F16D 65/0006; F16D 65/095; F16D 65/0971
USPC ........ 188/73.1, 73.37, 250 B, 250 D, 250 E, 188/250 G
See application file for complete search history.

(56) References Cited

U.S. PATENT DOCUMENTS

| | | | |
|---|---|---|---|
| 9,759,277 B2* | 9/2017 | Kobayashi | F16D 65/0006 |
| 2006/0027427 A1* | 2/2006 | Anda | F16D 65/0006 |
| | | | 188/73.1 |
| 2015/0354646 A1* | 12/2015 | Osada | F16D 65/0971 |
| | | | 188/73.37 |
| 2019/0128349 A1 | 5/2019 | Clent | |
| 2021/0054892 A1 | 2/2021 | Divakaruni et al. | |

FOREIGN PATENT DOCUMENTS

DE    202020101259 U1    3/2020

* cited by examiner

*Primary Examiner* — Christopher P Schwartz
(74) *Attorney, Agent, or Firm* — Robert James Harwood (57) ABSTRACT

A brake pad for a vehicle disk brake assembly includes a backing plate configured to support a brake lining. A plurality of openings extend through the backing plate to define retaining members. A shim includes a base and tabs extending into the openings to secure the shim to the backing plate. Each tab includes a first portion extending away from the base and a curved second portion extending from the first portion back towards the base.

18 Claims, 10 Drawing Sheets

RETENTION SYSTEM FOR SHIM ON BACKPLATE OF BRAKE PAD ASSEMBLY

TECHNICAL FIELD

The present invention relates to vehicle disc brake assemblies and in particular relates to a shim for a brake pad assembly.

BACKGROUND

A typical disc brake assembly for a vehicle includes a brake disc which is secured to a wheel of the vehicle for rotation therewith and non-rotating brake linings that are operable between non-braking and braking positions. Each of the brake linings is supported on a backing plate. In the non-braking position, the brake linings do not slow rotation of the brake disc and vehicle wheel. In the braking position, the brake linings are in frictional engagement with the brake disc to slow rotation of the brake disc and vehicle wheel.

Each of the brake pads include a brake lining supported by a backing plate. Each of the brake pads also typically include a shim or other noise isolator secured to the backing plate on the side of the backing plate opposite the brake lining. The shim provides dampening characteristics to reduce noise, vibration, or harshness that may occur during operation of the brake disc. The shims may be secured to backing plates by an adhesive bond.

Operation of the disc brake assembly results in lateral loading of the shim and an increased temperature for the shim. The loading and increased temperature may result in the adhesive of the bond becoming viscous. The adhesive becoming viscous reduces a strength of the adhesive bond. When the strength of the adhesive bond is reduced, the shim may laterally shift, i.e., shift perpendicular to a longitudinal direction of displacement for the brake pad, on the backing plate and reduce an effectiveness of the shim in reducing noise, vibration, and harshness. Thus, it would be desirable to have a brake pad with a shim that does not laterally shift under high loads and temperatures.

SUMMARY

In one example, a brake pad for a vehicle disk brake assembly includes a backing plate configured to support a brake lining. A plurality of openings extend through the backing plate to define retaining members. A shim includes a base and tabs extending into the openings to secure the shim to the backing plate. Each tab includes a first portion extending away from the base and a curved second portion extending from the first portion back towards the base.

In another example, a brake pad for a vehicle disk brake assembly includes a backing plate configured to support a brake lining. A plurality of openings extends through the backing plate to define retaining members. At least one projection extends into the opening of each retaining member. A shim includes a base and tabs extending into the openings to secure the shim to the backing plate. Each tab including a first portion extending away from the base and a curved second portion extending from the first portion back towards the base such that the second portion forms an acute angle with the first portion.

In another example, a shim is provided for a backing plate of a brake pad in a vehicle disk brake assembly. The shim includes a base and tabs extending from the base configured to extend into openings in the backing plate to secure the shim to the backing plate. Each tab includes a first portion extending away from the base and a curved second portion extending from the first portion back towards the base.

Other objects and advantages and a fuller understanding of the invention will be had from the following detailed description and the accompanying drawings.

DETAILED DESCRIPTION

Figure 1:
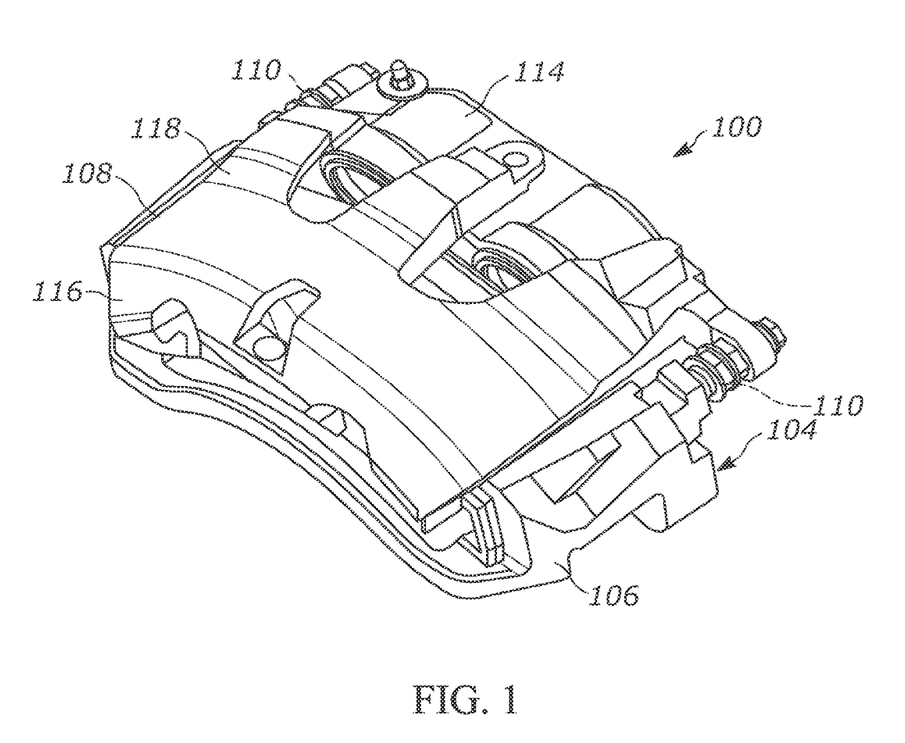
FIG. 1 is an elevation view of a vehicle disc brake assembly having a first embodiment of a brake pad in accordance with the present invention.

The present invention relates to vehicle disc brake assemblies and in particular relates to a shim for a brake pad assembly. FIGS. 1-6B illustrates an example disc brake assembly 100 in accordance with an aspect of the invention. Referring now to FIG. 1 there is illustrated a vehicle disc brake assembly, indicated generally at 100. The disc brake assembly 100 is for applying braking friction to a brake disc (not shown) of a vehicle (also not shown). The general structure and operation of the disc brake assembly 100 is well known to those skilled in the art.

For example, the disc brake assembly 100 may be as disclosed by U.S. Patent Application Publication No. 2018/0223928 to Miller et al., U.S. Patent Application Publication No. 2018/0238406 to Gerber et al., U.S. Pat. No. 8,844,683 to Sternal et al., or U.S. Patent Publication No. 2018/0087589 to Gerber et al., the disclosures of all of which are hereby incorporated by reference herein in their entirety.

Figure 2:
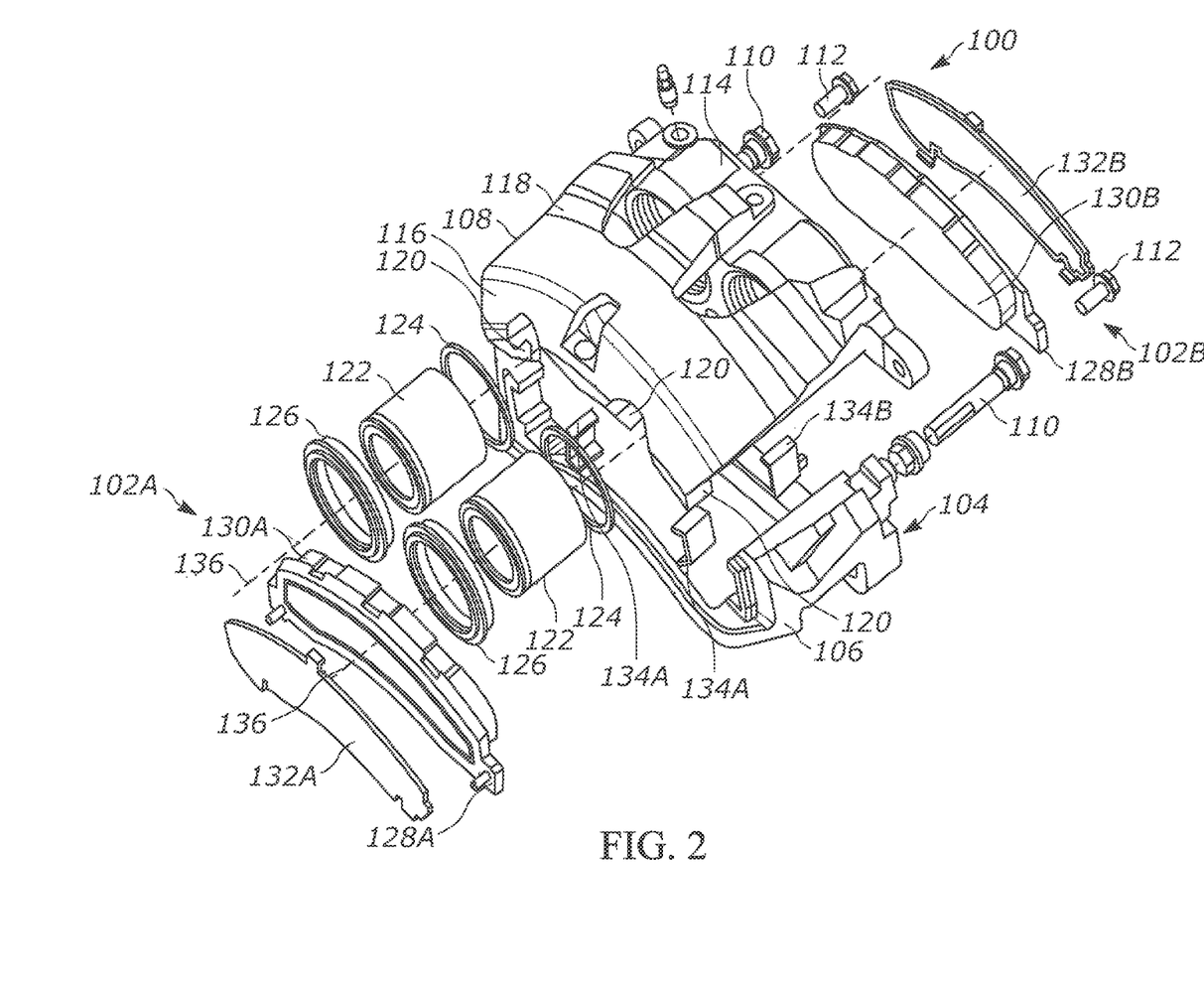
FIG. 2 is an exploded view of the vehicle disc brake assembly of FIG. 1.
Figure 3:
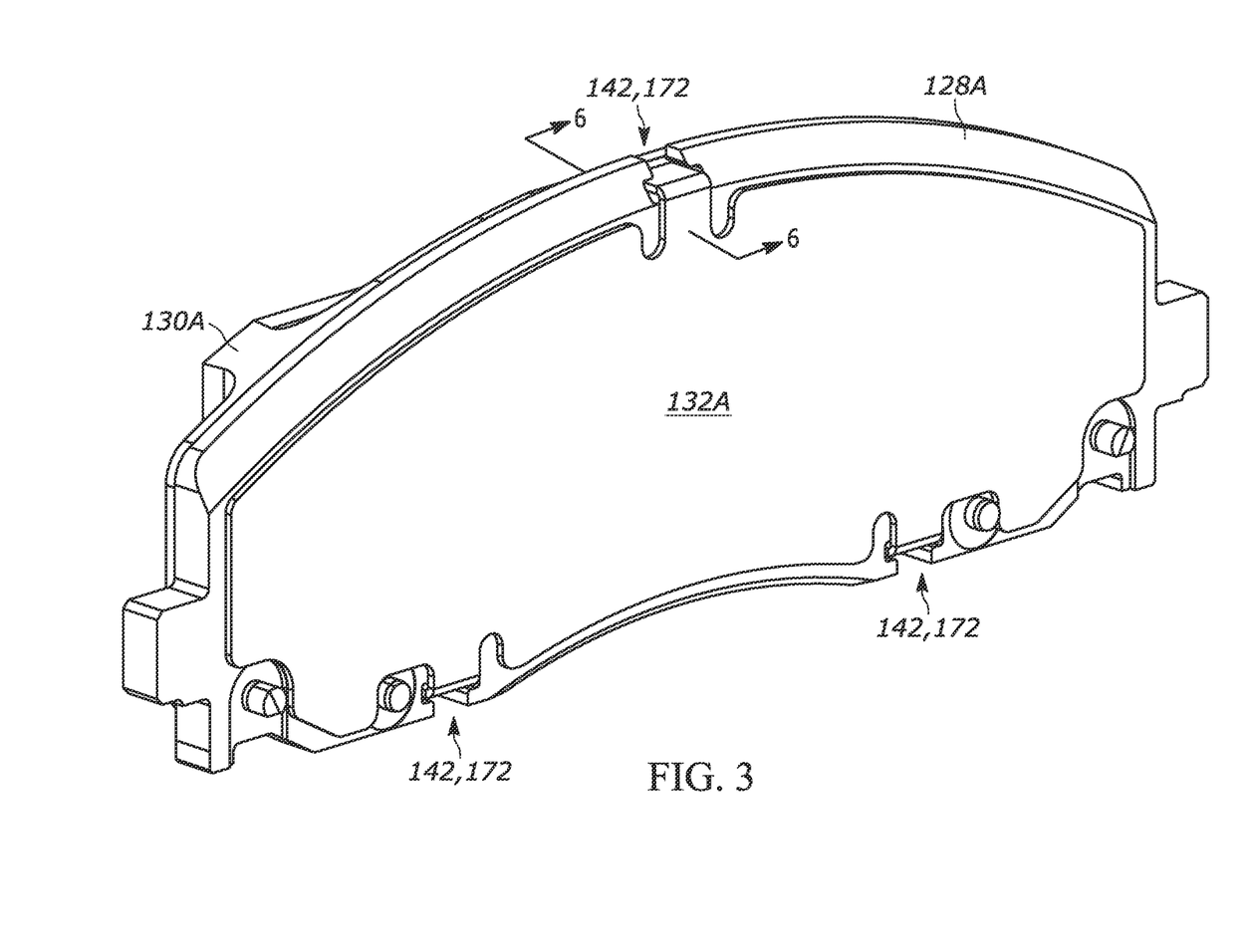
FIG. 3 is a schematic illustration of an assembled backing plate and shim of the brake pad of FIG. 1.

One example disc brake assembly 100 shown in FIG. 2 has outer and inner brake pads indicated generally at 102A and 102B, respectively. The outer and inner brake pads 102A and 102B, respectively, are not limited to use with the specific disc brake assembly 100 described herein. The brake pads 102A, 102B are substantially identical and, thus, discussion is limited in the interest of brevity to the outer brake pad 102A. That said, while the invention may be discussed with regard to the outer brake pad 102A—the invention is not limited to outer brake pads and may be utilized with any suitable brake pad.

With this in mind, the disc brake assembly 100 includes a caliper assembly indicated generally at 104. The caliper assembly 104 includes an anchor bracket 106 and a caliper 108. The caliper 108 is slidably supported on the anchor bracket 106 by pins 110. The anchor bracket 106 is, in turn, secured to a stationary component of the vehicle, such as for example an axle flange (not shown) or a steering knuckle (also not shown) by a pair of mounting bolts 112. The caliper 108 includes an inner portion 114 and an outer portion 116 connected by a bridge section 118. The caliper outer portion 116 includes fingers 120. A pair of hydraulic actuators, for example pistons 122, connect to hydraulic ports (not shown) of the caliper inner portion 114.

Seals 124 are disposed between the pistons 122 and their respective hydraulic ports for creating a sealed surface between the hydraulic ports and the pistons 122. Dust seals 126 are coupled to exposed ends of the pistons 122. The dust seals 126 prevent dust and other contaminants from forming on the end portions of the pistons 122.

The outer brake pad 102A is supported by the anchor bracket 106 and includes an outer backing plate 128A, an outer brake lining 130A, and an outer shim or noise insulator 132A. The outer brake lining 130A is secured or otherwise supported on the outer brake pad 102A. Clips 134A mate with end portions of the outer backing plate 128A. The clips 134A assist in retaining the outer backing plate 128A on the anchor bracket 106 in addition to preventing rattling of the outer backing plate 128A.

The inner brake pad 102B is also supported by the anchor bracket 106 and includes an inner backing plate 128B, an inner brake lining 130B, and an inner shim or noise insulator 132B. The inner brake lining 130B is secured or otherwise supported on the inner brake pad 102B. Clips 134B mate with end portions of the inner backing plate 128B. The clips 134B assist in retaining the inner backing plate 128B to the anchor bracket 106 in addition to preventing rattling of the inner backing plate 128B.

In a non-braking or release position, the outer and inner brake linings 130A and 130B, respectively, are disposed with a small air clearance on both sides of the brake disc. As a result, no significant braking friction occurs from the outer and inner brake linings 130A and 130B, respectively, on the brake disc.

When braking is desired for a vehicle having the disc brake assembly 100, the disc brake assembly is hydraulically actuated. The disc brake assembly 100 may be hydraulically actuated by a driver via a brake pedal or via a drive assistance system. When the disc brake assembly 100 is hydraulically actuated, hydraulic fluid is pressurized (by a suitable means known to those skilled in the art) such that the pistons 122 are displaced longitudinally along axes 136 and against the inner brake pad 102B. As a result, the inner brake lining 130B is pressed along the axes 136 and onto the brake disc by the pistons 122.

At the same time, a corresponding displacement of the caliper 108 on an opposite side of the brake disc causes the outer brake lining 130A to be drawn along the axis 136 and against the opposite side of the brake disc. When drawn against the brake disc, the outer and inner brake linings 130A and 130B, respectively, are in a braking position and apply braking friction to the brake disc. The braking friction slows or stops rotation of the brake disc and, as a result, the vehicle is braked.

Figure 4A:
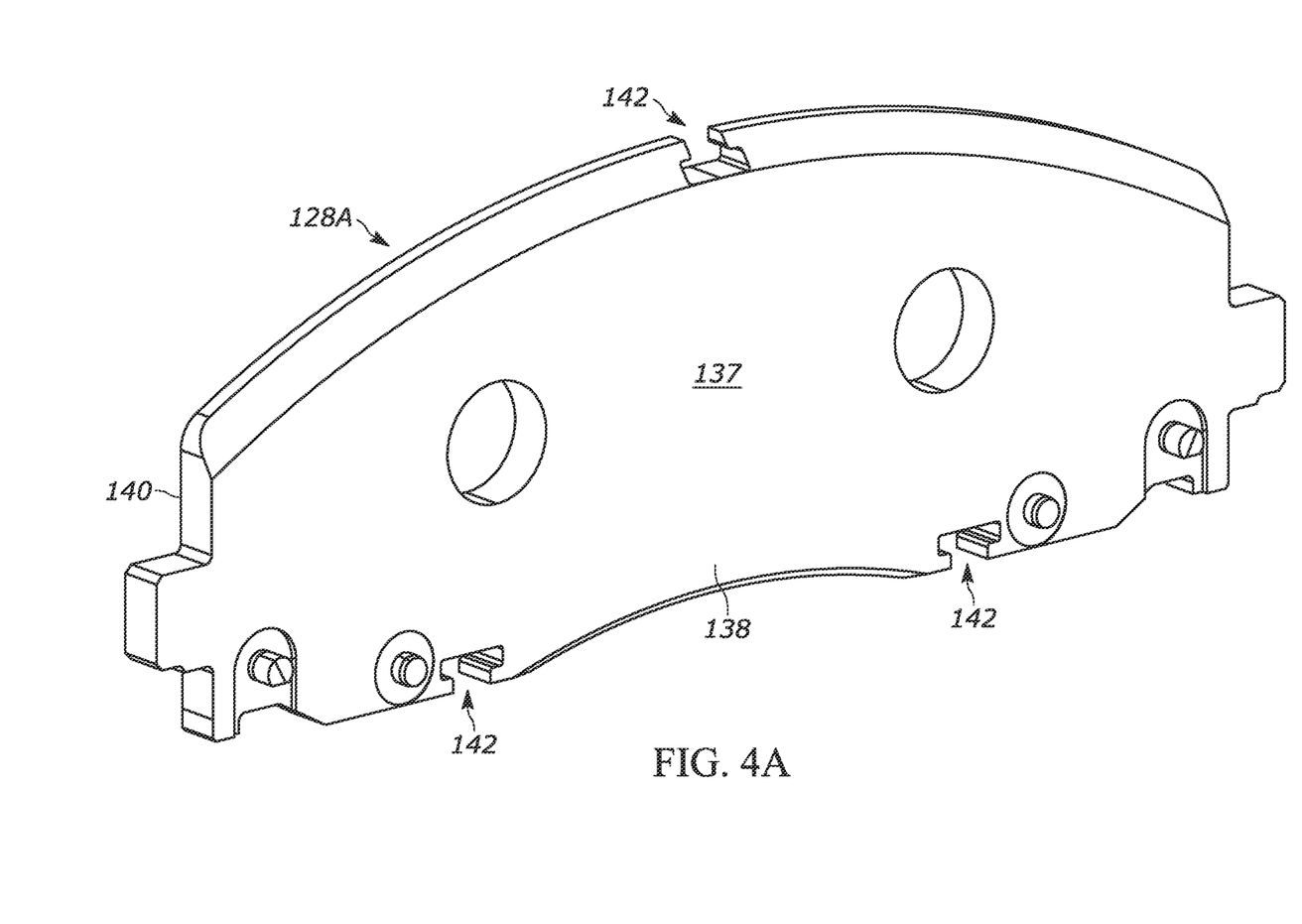
FIG. 4A is a front view of the backing plate of FIG. 3.
Figure 4B:
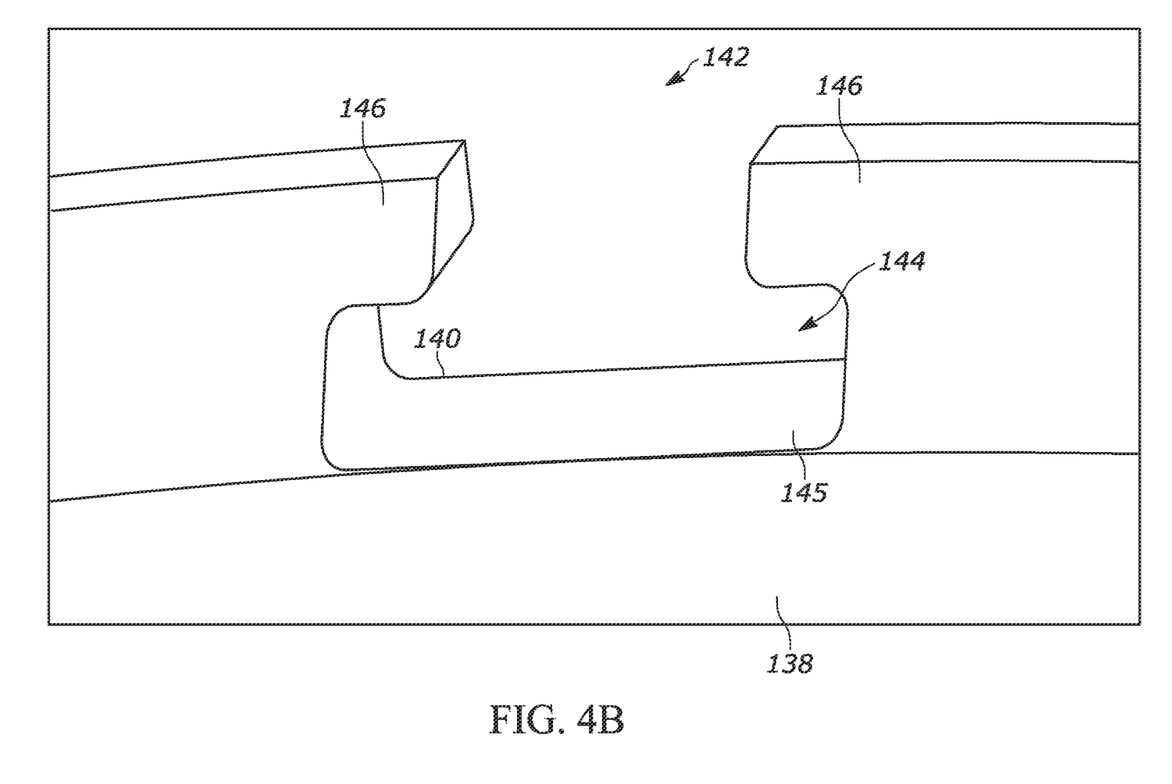
FIG. 4B is an enlarged view of a portion of FIG. 4A.

Referring now to FIGS. 4A-4B, the outer backing plate 128A is illustrated in detail. The outer backing plate 128A includes a base 137 having opposite first and second faces 138 and 140, respectively, extending transversely to the axis 136. A series of retaining members 142 are provided along the periphery of the base 137. In one example, each retaining member 142 includes an opening 144 defined by an inner surface 145 of the base 137. The openings 144 extend entirely through the base 137 from the first face 138 to the second face 140. A pair of opposing projections 146 extends into the opening 144. Alternatively, a single projection 146 can span the opening 144 (not shown).

Figure 5:
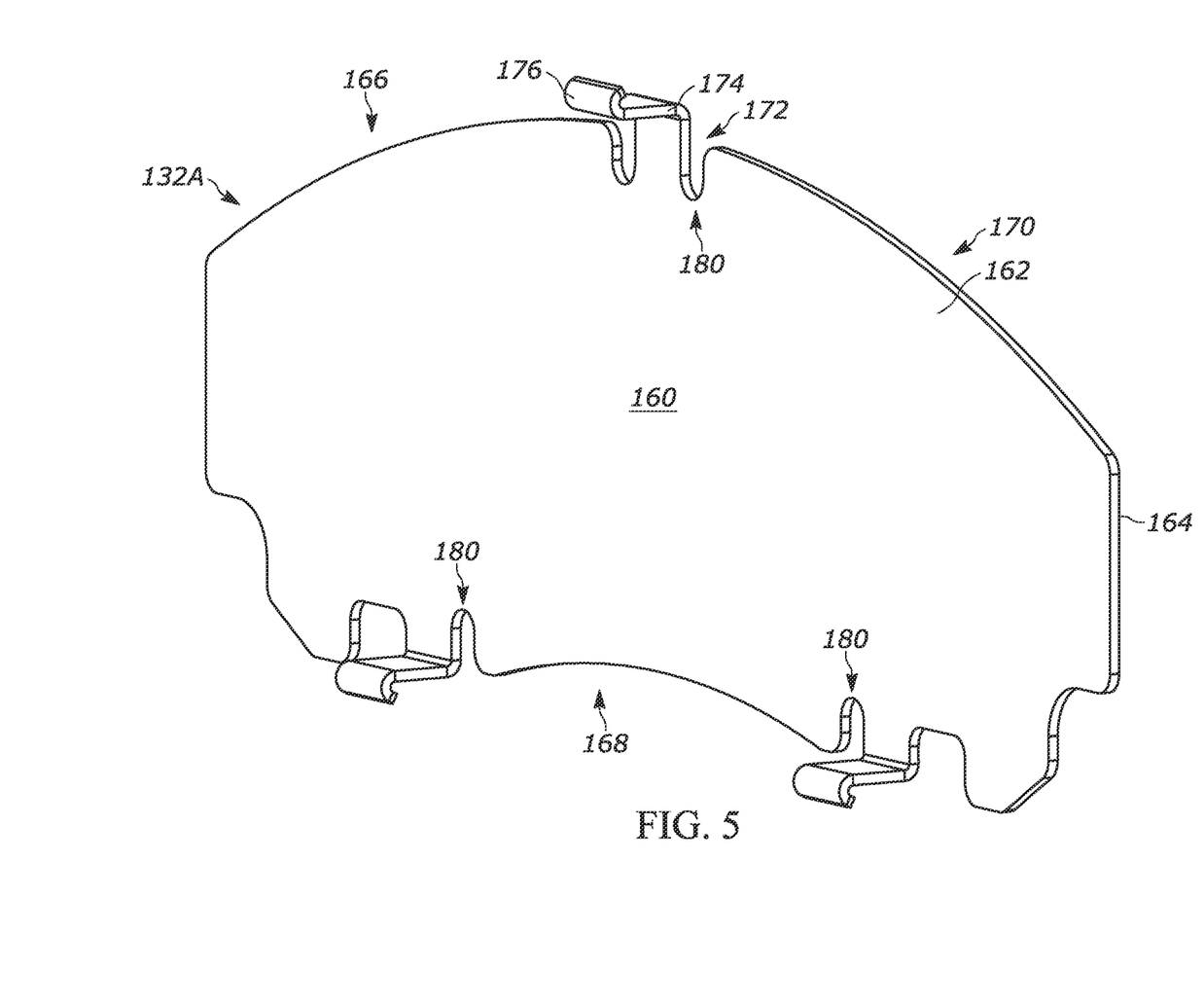
FIG. 5 is a front view of the shim of FIG. 3.

Referring to FIG. 5, the shim 132A includes a planar base 160 having opposite first and second faces 162, 164 and extends from a first end 166 to a second end 168. Retention features or members formed as, for example, tabs 172 extend from the base 160. In one example, a single tab 172 extends from the first end 166. A pair of tabs 172 extends from the second end 168. Each tab 172 includes a first portion 174 extending away from the base 160 and a second portion 176 extending from the first portion. The second portion 176 extends a length $L_1$ from the first portion 174 and terminates at an end surface 178.

A pair of notches 180 can be provided on each side of the tab 172 and extend into the base 160. As shown, the notch 180 on the first end 166 extends towards the second end 168. The notches 180 on the second end 168 extend towards the first end 164. In any case, the first portion 174 extends in a first direction indicated generally by the arrow A away from the first face 162 of the base. The second portion 176 is curved and extends generally back towards the first face 162 in a direction opposite the direction A. For example, the second portion 176 can be curved so as to extend at an acute angle α relative to the first portion 174.

Regardless of the angle α, the second portions 176 are curved outward and away from the respective ends 166, 168. In other words, the second portion 176 at the first end 166 is curved upwards (as shown). The second portions 176 at the second end 168 are curved downwards (as shown). It will be appreciated that the first portion 174 can constitute only the portion extending substantially perpendicular to the first face 162 or include the portion extending downward (as shown) between the notches 180, in which case the first portion is substantially L-shaped.

The shim 132A is secured to the back plate 128A (see also FIG. 3) by aligning the tabs 172 with the retaining members 142 and urging/pushing the tabs through the openings 144 between the projections 146 and inner surface 145. The resilient construction of the tab 172 enables it to elastically deform to allow insertion through the opening 144.

Figure 6A:
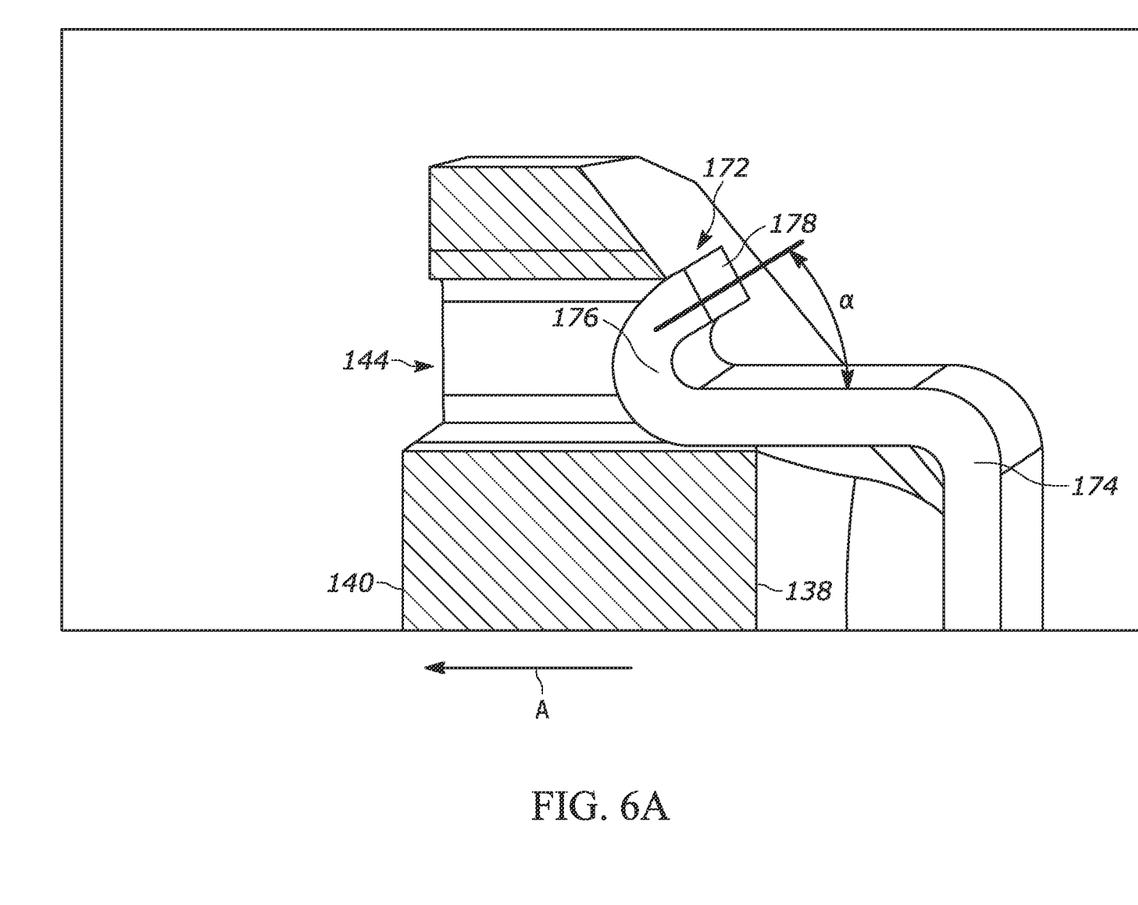
FIGS. 6A-6B are schematic illustrates of installation of the shim on the backing plate.
Figure 6B:
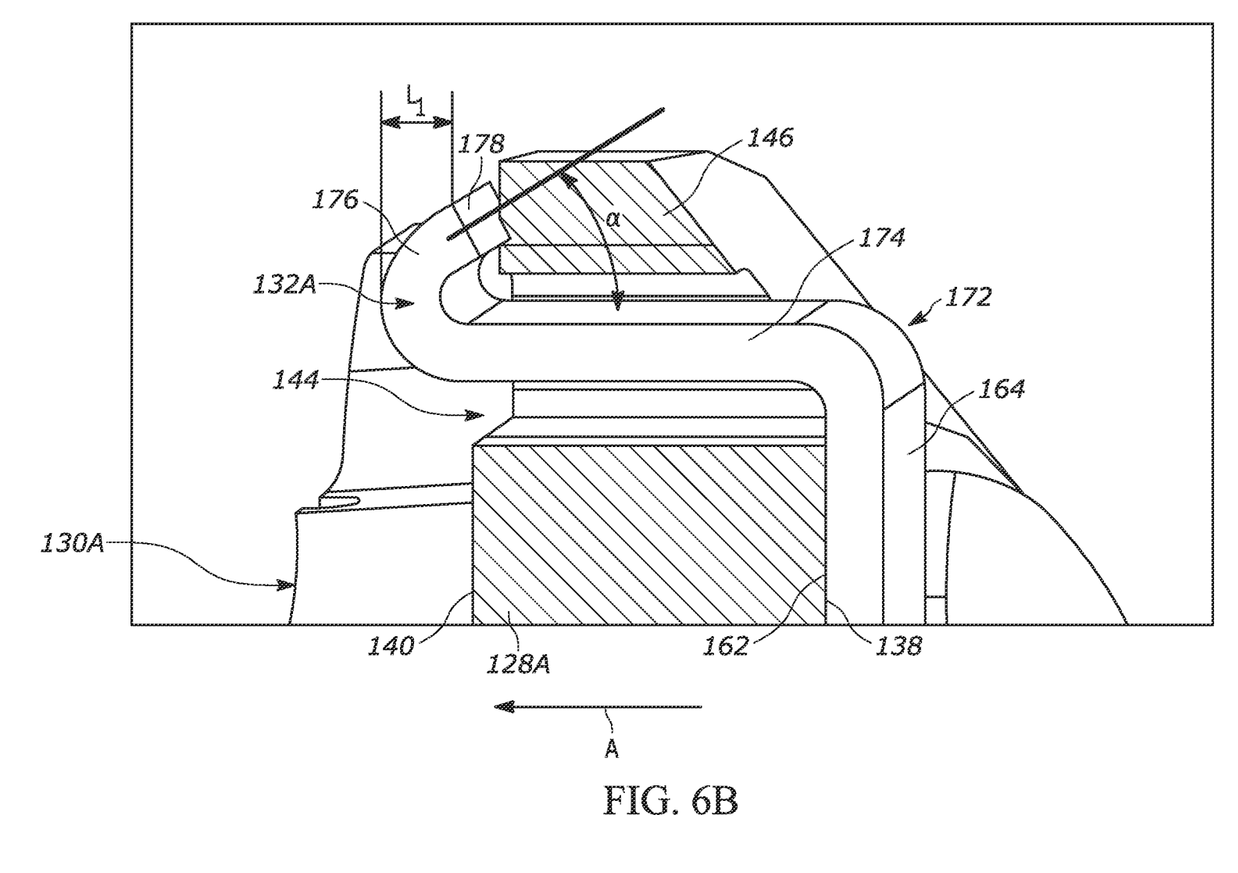

More specifically, the second portion 176 is the first part of the tab 172 to enter the opening 144. As the shim 132A is advanced in the direction A, the second portion 176 engages the tabs 146, which deflect the second portion towards the first portion 174 such that the angle α decreases. The second portion 176 deflects towards the first portion 174 sufficient to allow the tab 172 to pass through the opening 144.

Once the end surface 178 exits the opening 144, the second portion 176 automatically deflects away from the first portion 174, i.e., the angle α therebetween increases. The end surface 178 automatically moves into alignment with the projections 146. The shim 132A is configured such that the end surface 178 exits the opening 144 at the same time the first side 162 of the base 160 moves into engagement with the first side 138 of the back plate 128A. Consequently, the end surface 178 and first side 162 are held against the respective projection 146 and first side 138 by the resilience in the tabs 172. In this manner, the tabs 172 and retaining members 142 cooperate to form a retention system for securing the shim 132A to the back plate 128A.

Figure 7:
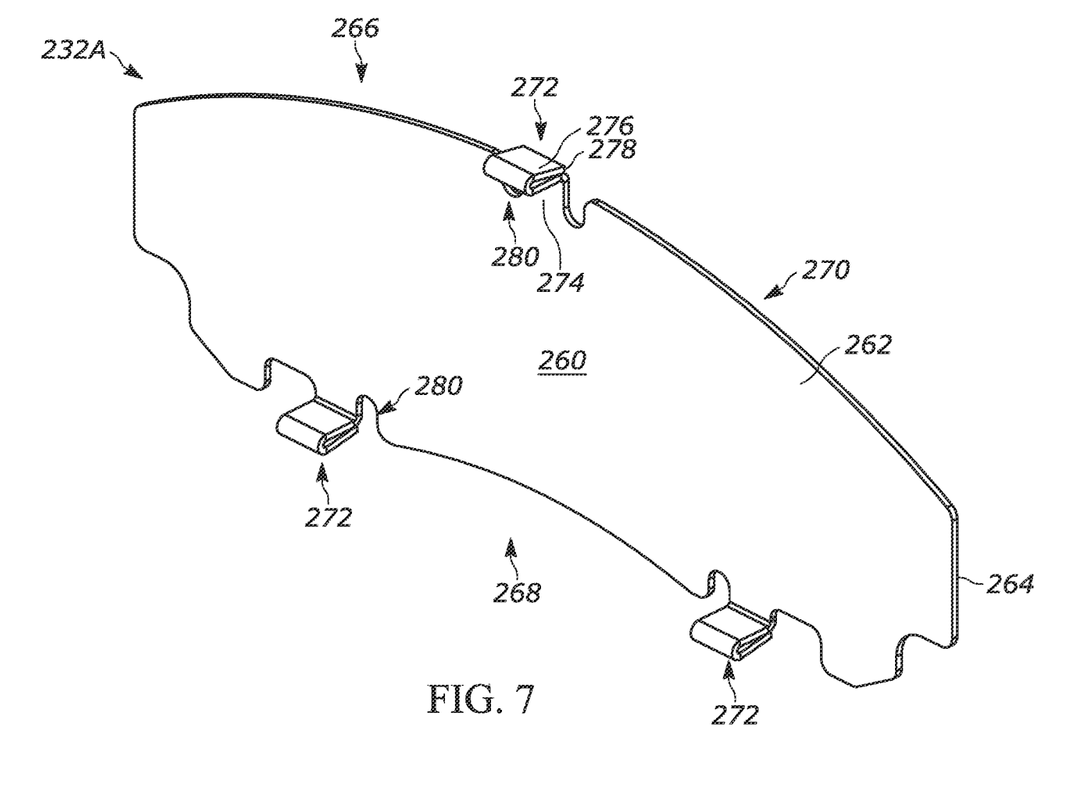
FIG. 7 is a front view of another example shim.
Figure 8:
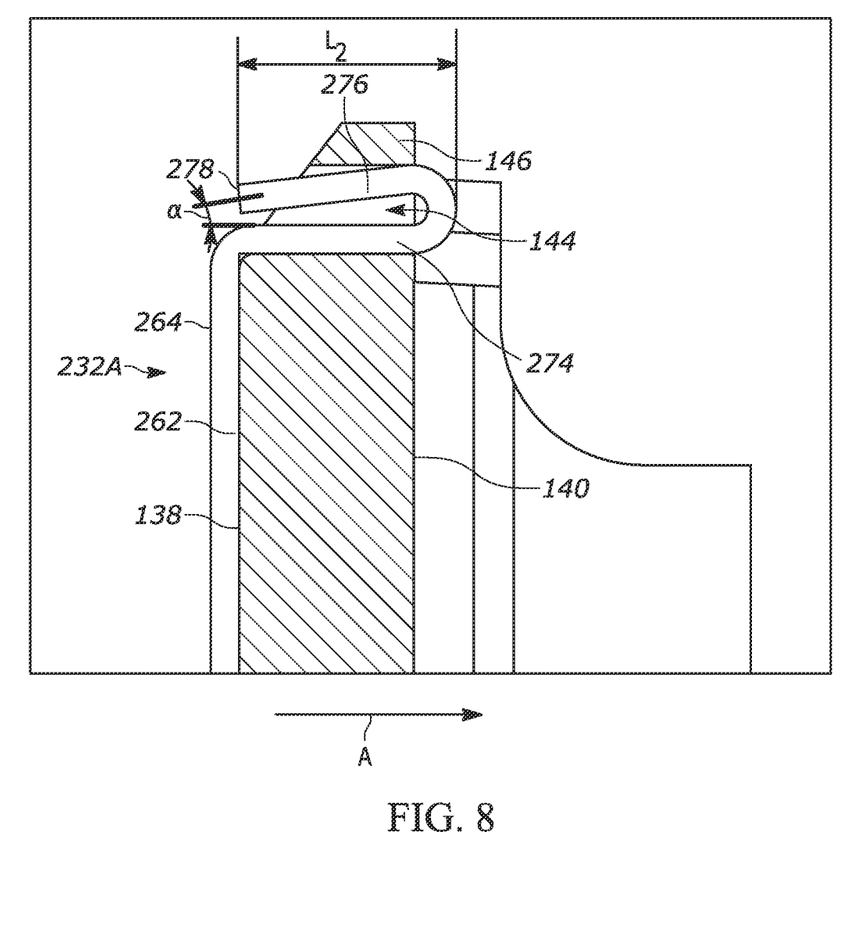
FIG. 8 is a schematic illustration of the shim of FIG. 7 installed on a backing plate.

FIGS. 7-8 illustrate another example shim 232A in accordance with the present invention. The shim 232A is similar to the shim 132A and, thus, features of the shim 232A are given reference numbers 100 greater than the corresponding feature in the shim 132A.

In this example, the second portion 276 extends a length $L_2$ from the first portion 274 and terminates at an end surface 278. The length $L_2$ of the second portion 276 is greater than the length $L_1$ of the second portion 176. Moreover, the curvature of the second portions 276 of the tabs 272 is more severe such that the second portions are angled towards the first portions 274. In other words, the angle α between the first and second portions 274, 276 is less than the angle between the first and second portions 174, 176 on the shim 132A.

The shim 232A is secured to the back plate 128A by aligning the tabs 270 with the retaining members 142 and urging/pushing the tabs into the openings 144 between the projections 146 and inner surface 145. The resilient construction of the tab 270 enables it to elastically deform to allow insertion through the opening 144.

More specifically, the second portion 276 is the first part of the tab 270 to enter the opening 144. As the shim 232A is advanced in the direction A, the second portion 276 engages the tabs 146, which deflect the second portion towards the first portion 274 such that the angle α decreases. The second portion 176 deflects towards the first portion 174 sufficient to allow the tab 172 to pass into the opening 144.

The second portion 276 is long enough that the end surface 278 will not pass through the opening 144. Rather, the shim 232A is configured such that the second portion 276 becomes pinched or sandwiched between the first portion 274 and the projections 146 at the same time the first side 162 of the base 160 moves into engagement with the first side 138 of the back plate 128A. That said, the tendency of the second portion 276 to move away from the first portion 274 forms a biasing force between the tab 270 and projection 146, thereby helping to secure the same together.

The shims help to dampen noise from the back plates during brake operation due to rattling, etc. That said, several factors can contribute to reducing the shim's dampening ability. This can include, for example, wear, fatigue and/or misassembling the shim on the back plate. That said, the secure, robust connection between the shims and the back plates shown and described herein helps to prevent or limit relative movement therebetween and, regardless, help prevent the shim from detaching completely from the back plate during operation of the vehicle/brake and/or during shipping.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A brake pad for a vehicle disk brake assembly, the brake pad comprising:
    a backing plate configured to support a brake lining, a plurality of openings extending through the backing plate to define retaining members, at least one projection on the backing plate extending into the opening of each retaining member;
    a shim including a base and tabs extending into the openings to secure the shim to the backing plate, each tab including a first portion extending away from the base and a curved second portion extending from the first portion back towards the base.

2. The brake pad recited in claim 1, wherein the tabs are provided on a first end of the base and a second end opposite the first end.

3. The brake pad recited in claim 2, wherein an uneven number of tabs are provided on the base.

4. The brake pad recited in claim 1, wherein the base of the shim is provided on a first side of the projections and the tabs extend to a second side of the projections opposite the first side.

5. The brake pad recited in claim 1, wherein the first and second portions of each tab are held between the projections and a surface defining the opening.

6. The brake pad recited in claim 1, wherein the second portion extends entirely through the opening and includes an end surface for engaging the at least one projection to secure the shim to the backing plate.

7. The brake pad recited in claim 1, wherein the second portion is curved to form an acute angle with the first portion.

8. A brake pad for a vehicle disk brake assembly, the brake pad comprising:
    a backing plate configured to support a brake lining, a plurality of openings extending through the backing plate to define retaining members, at least one projection extending into the opening of each retaining member;
    a shim including a base and tabs extending into the openings to secure the shim to the backing plate, each tab including a first portion extending away from the base and a curved second portion extending from the first portion back towards the base such that the second portion forms an acute angle with the first portion.

9. The brake pad recited in claim 8, wherein the tabs are provided on a first end of the base and a second end opposite the first end.

10. The brake pad recited in claim 9, wherein an uneven number of tabs are provided on the base.

11. The brake pad recited in claim 8, wherein the base of the shim is provided on a first side of the projections and the tabs extend to a second side of the projections opposite the first side.

12. The brake pad recited in claim 8, wherein the first and second portions of each tab are held between the projections and a surface defining the opening.

13. The brake pad recited in claim 8, wherein the second portion extends entirely through the opening and includes an end surface for engaging the at least one projection to secure the shim to the backing plate.

14. A shim for a backing plate of a brake pad in a vehicle disk brake assembly, the shim comprising:
    a base; and
    tabs extending from the base configured to extend into openings in the backing plate to secure the shim to the backing plate, each tab including a first portion extending away from the base and a curved second portion extending from the first portion back towards the base, wherein at least one projection on the backing plate extends into each opening to define retaining members in the backing plate, and wherein the base of the shim is provided on a first side of the projections and the tabs extend to a second side of the projections opposite the first side.

15. The shim recited in claim 14, wherein the second portion includes an end surface for engaging the at least one projection to secure the shim to the backing plate.

16. The shim recited in claim 14, wherein the second portion is curved to form an acute angle with the first portion.

17. The shim recited in claim 14, wherein the tabs are provided on a first end of the base and a second end opposite the first end.

18. A shim for a backing plate of a brake pad in a vehicle disk brake assembly, the shim comprising:
 a base; and
 tabs extending from the base configured to extend into openings in the backing plate to secure the shim to the backing plate, each tab including a first portion extending away from the base and a curved second portion extending from the first portion back towards the base, wherein at least one projection on the backing plate extends into each opening to define retaining members in the backing plate, wherein the first and second portions of each tab are held between the projections and a surface defining the opening.

* * * * *